March 5, 1968     A. W. SPITZ     3,371,756

HEAT DISSIPATING BRAKE

Filed Jan. 18, 1966

INVENTOR.
ALBERT W. SPITZ

BY *Karl L. Spivak*

ATTORNEY.

United States Patent Office 3,371,756
Patented Mar. 5, 1968

3,371,756
HEAT DISSIPATING BRAKE
Albert W. Spitz, 835 Glenside Ave.,
Wyncote, Pa. 19095
Filed Jan. 18, 1966, Ser. No. 536,241
2 Claims. (Cl. 188—251)

ABSTRACT OF THE DISCLOSURE

A heat dissipating brake including an aluminum or aluminum alloy rim, said rim having a brake drum formed therein, and said brake drum being hard anodized to provide a finished brake drum coating of thickness between 0.002 inch and 0.005 inch.

---

This invention relates in general to the broad field of automotive and aircraft braking devices and is more particularly directed to an extremely light-weight drum assembly of high thermal conductivity capable of efficiently and rapidly dissipating large quantities of heat produced as the result of braking activities at various vehicular speeds.

The standard American automobile service brake is usually of the internally expanding type that is hydraulicly activated by an individual wheel cylinder in response to pressure applied to the brake pedal located within the automobile. The brake drum diameters vary from ten inches to twelve inches as limited by the rim diameter of the wheels. The width of the drum is a function of the weight of the automobile and the usual design requirements vary between sixteen to twenty-three pounds of car weight per square inch of brake area. The drum friction surfaces are usually cast iron or iron alloy for optimum results and the cooperating brake shoes are lined with a compressed absestos or other composition having a similar high coefficient of friction.

In land conveyances where weight is not a prime factor, conventional braking systems as above described are in common use, generally performing faithfully in accordance with their design criteria. However, in those applications where weight must be kept to a minimum, the employment of ordinary braking methods would be entirely unsuitable. For example, vehicles intended for airborne travel and for marine duty aboard naval vessels must be as light as possible, consistent with sound structural considerations. In an effort to reduce the overall weight of the various vehicles, it is now common practice to utilize strong materials other than iron and steel, such as various light metals and plastics, wherever such a substitution can conveniently and safely be made. With this in mind, designers looked to aluminum as a material possessing the required strength, workability, density and thermal properties to replace the usual heavy cast iron brake drums.

It was found that aluminum brake drums were considerably lighter than their cast iron counterparts thereby reducing the total weight of the vehicle, and thus boosting the horsepower to weight ratio. An examination of the physical properties of the materials reveals that aluminum offers more than a sixty percent reduction in weight over conventional brake materials without sacrificing ability to absorb heat. In fact, with a specific heat of .215 as compared to iron's .108, aluminum is capable of absorbing twice as much heat energy as cast iron for an equal rise in temperature. Further, aluminum dissipates heat much faster than cast iron since its thermal conductivity is approximately four times greater.

Brakes as presently available are designed to compensate for the instantaneous build-up of heat produced by the transformation of quantities of foot pounds of kinetic energy of a moving vehicle during the braking activity. Because the presently used materials do not dissipate the produced heat fast enough, most of the heat developed must be absorbed by the brake itself. When using cast iron for the braking surface, the heat dissipation consideration requires more material, and consequently, even more weight is thereby added. It is thus seen that the employment of aluminum is desirable in that it absorbs the heat, dissipates the heat and simultaneously reduces the overall weight.

Despite all of the advantages above set forth indicating that aluminum apparently provides the optimum solution to most brake problems involving weight, experience has proven that untreated aluminum cannot function as intended. It has been determined that upon use, the asbestos or other similar brake lining material tends to wear away the aluminum or soft aluminum oxide drum surface. Aluminum particles from the drum become imbedded in the face of the lining material, and in a relatively short period of time mechanically form an aluminum film over the entire lining surface. Once the aluminum film has developed, the brake becomes entirely inoperative as the metallic surface of the brake drum and the metallic film of the brake lining will seize and thereby cause sudden, jarring stops.

In an effort to retain the weight and thermal advantages of aluminum, other workers in the field have attempted to treat the drum surface metallurgically by spraying on a coating of stainless steel. This method has proven to be so expensive to date as to be entirely impractical at this time. Others have attempted to cast metallic inserts of various metals to produce a satisfactory brake drum surface without unduly sacrificing the weight. This method too has failed to produce a workable brake inasmuch as the cast materials have a tendency to chip out under the severe friction and heat conditions associated with normal brake use.

It is therefore an object of this invention to provide an improved heat dissipating brake of the type set forth.

It is another object of this invention to provide a novel heat dissipating brake comprising a single integral metallic forging or casting.

It is another object of this invention to provide a heat dissipating brake capable of absorbing large quantities of heat.

It is another object of this invention to provide a heat dissipating brake of light metal construction having a hardened drum surface to eleminate wear.

It is another object of this invention to provide a novel heat dissipating brake of light metal construction incorporating a drum surface hardened by an oxide of the metal.

It is another object of the invention to provide a novel heat dissipating brake that is inexpensive in manfacture, rugged in construction and trouble free upon use.

Other objects and a fuller understanding of the invention will be had by referring to the following description and claims of a preferred embodiment thereof, taken in conjunction with the accompanying drawing wherein like reference characters refer to similar parts throughout the several views and in which:

Figure 1:
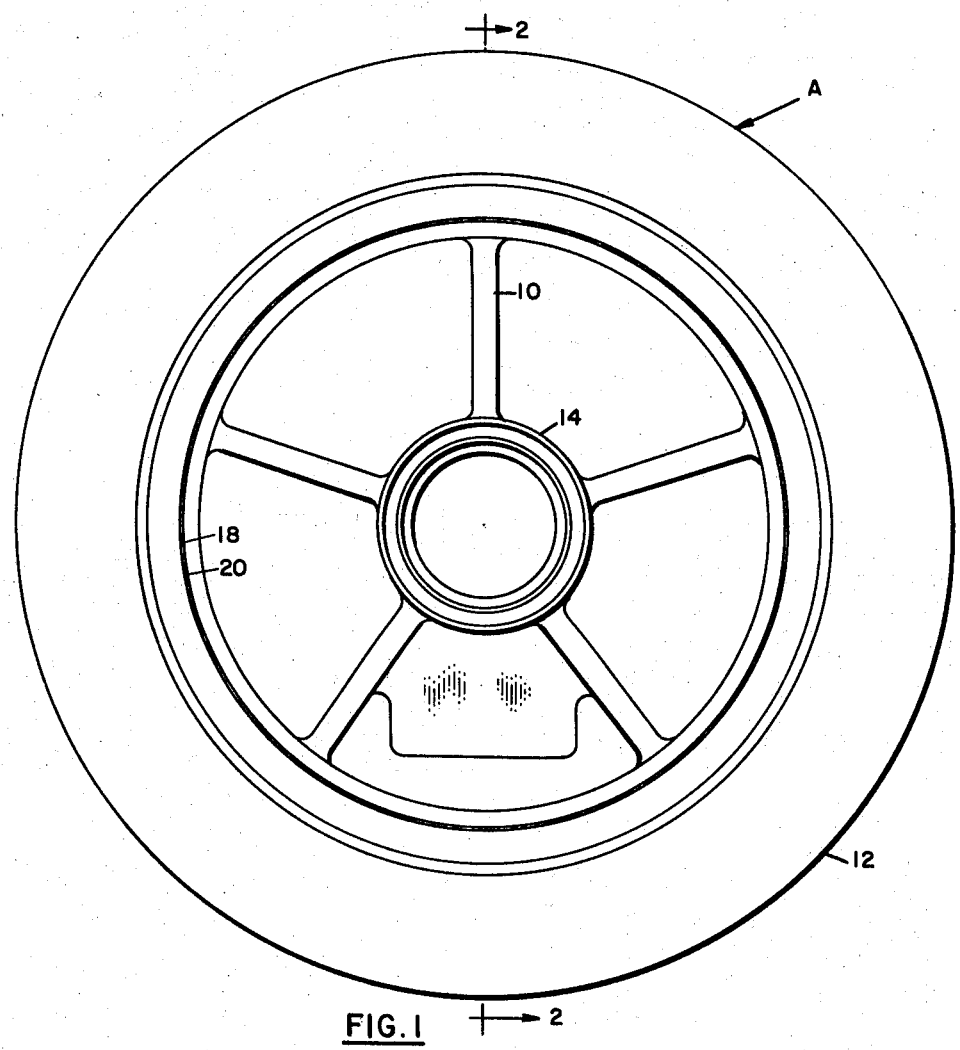
FIG. 1 is an elevational view of a brake drum associated with a wheel in accordance with the instant invention.
Figure 2:
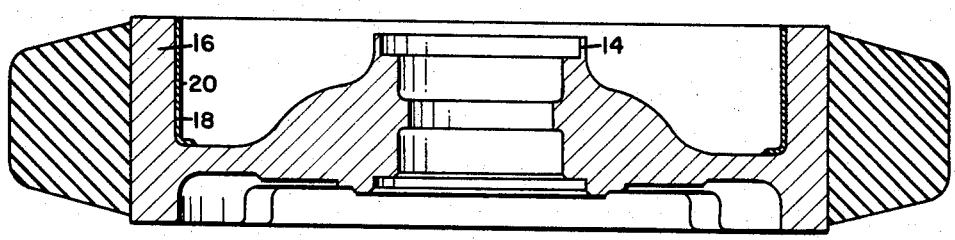
FIG. 2 is a cross section taken along line 2—2 of FIG. 1.

Although specific terms are used in the following description for the sake of clarity, these terms are intended to refer only to the particular structure of my invention selected for illustration in the drawings and are not intended to define or limit the scope of the invention.

Referring now to the drawings, I show a vehicular wheel generally designated A comprising a metallic rim 10 of aluminum and a molded rubber tire 12 peripherally affixed thereto in any well known manner. A centrally positioned hub 14 is integrally formed in the rim 10 for operation with standard wheel bearings and wheel axle (not shown) in accordance with usual practice.

In the instant invention, the rim 10 may be cast, forged or stamped, and I prefer to use aluminum or one of its higher purity alloys preferably containing less than 5% copper or 8% silicon for this application. An interiorly facing brake drum 16 is concentrically formed in the aluminum rim. The brake drum surface 18 should be clean and formed with a minimum abrasion, erosion or pitting suitable for receiving a surface hardening treatment as hereinafter more fully set forth.

Once the brake drum surface 18 has been properly prepared, a hard anodic coating 20 having a finished coating thickness of approximately 0.002 inch may be applied by the formation of aluminum oxide on the surface 18 which has been made the anode in a suitable electrolyte bath. It is the essence of this invention to provide a hard anodized coating, as by an electrolytic bath process, to build up a hardened surface to withstand the extreme pressures encountered during the normal braking procedures. As previously stated, soft aluminum oxide is not suitable and will rub off in the brake lining material, thereby possibly causing undesirable and dangerous seizing. After coating, the rim is thoroughly washed in water, dried, and the coating 20 may be honed as required to produce the desired surface finish. While coatings can be applied to a thickness of approximately 0.005 inch, I have found that flaking is minimized and heat transfer improved by utilizing thinner coatings.

It is critical to maintain the coating thickness above the minimum stated thickness of 0.002 inch inasmuch as the possibility of fault increases in direct ratio to the reduction in thickness. Such faults could produce failure due to the lack of sufficient body under the severe conditions of braking a heavy vehicle and thus introduce a greatly increased danger factor, which if ignored, could result in complete brake failure.

When coatings over 0.005 inch in thickness are applied, the increased thickness of the hard anodizing has no actual value, and increases the possibility of flaking or chipping. Further, the added costs of the additional thickness provides no additional value to the brake either in increased efficiency or in increased longevity of the coated brake surface. Experiments have proved that the extremely thin (.002 to .005 inch) coating of head anodizing can attain and maintain the required brake pressures.

The finished coating 20 should be substantially uniform in thickness and should be firmly adhered to the drum surface 18. The applied coating material should be dense and should weigh not less than 0.030 gram per square inch per 0.001 inch of coating thickness. Coatings meeting the standards of AMS2469A, Aerospace Material Specifications, published by Society of Automotive Engineers, Inc., issued June 30, 1962, revised June 30, 1964 and entitled "Process and Performance Requirements for Hard Coating Treatment of Aluminum Alloys" are suitable for the purpose of this invention.

When properly applied, the coating will be dense, uniform in appearance, and will appear dark grey to almost black in color. The coating material will be strongly affixed to the drum surface and will show no evidence of delamination, peeling or flaking when the drum surface is tensioned as under operating conditions at elevated temperatures.

Although I have described my invention with a certain degree of particularity, it is understood that the present disclosure has been made only by way of example and that numerous changes in the details of construction and the combination and arrangement of parts may be resorted to without departing from the spirit and scope of the invention as hereafter claimed.

What is claimed is:
1. In a heat dissipating brake, the combination of
   (A) an aluminum rim;
   (B) a brake drum formed in the said rim,
      (1) said brake drum including an exposed braking surface;
   (C) a wearing surface intimately affixed to the said braking surface,
      (1) said wearing surface comprising a hard anodized aluminum oxide coating,
      (2) said wearing surface being not less than 0.002 inch in thickness,
      (3) said wearing surfaces being not more than 0.005 inch in thickness, and
      (4) said wearing surface having a smooth, exposed surface.
2. The invention of claim 1 wherein the said wearing surface is concentric with the said rim and is of uniform thickness throughout.

References Cited
UNITED STATES PATENTS

| | | | |
|---|---|---|---|
| 1,746,494 | 2/1930 | Norton | 188—218 |
| 1,825,653 | 10/1931 | Cautley. | |
| 1,935,331 | 11/1933 | Norton | 188—218 X |
| 2,745,798 | 5/1956 | Haueisen et al. | 188—251 |
| 2,822,218 | 2/1958 | Whitfield | 301—6 |
| 3,038,563 | 6/1962 | Boeghold | 188—218 |

MILTON BUCHLER, *Primary Examiner.*

FERGUS S. MIDDLETON, *Examiner.*

B. S. MOWRY, G. E. HALVOSA, *Assistant Examiners.*